(12) United States Patent
Moussavi et al.

(10) Patent No.: US 6,760,331 B1
(45) Date of Patent: *Jul. 6, 2004

(54) MULTICAST ROUTING WITH NEAREST QUEUE FIRST ALLOCATION AND DYNAMIC AND STATIC VECTOR QUANTIZATION

(75) Inventors: Farshid Moussavi, San Francisco, CA (US); Dhaval N. Shah, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/283,109

(22) Filed: Mar. 31, 1999

(51) Int. Cl.[7] .......................... H04L 12/28; H04L 12/56

(52) U.S. Cl. ....................... 370/390; 370/415

(58) Field of Search ................... 370/389, 390, 370/412–418, 428, 429

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |

(List continued on next page.)

FOREIGN PATENT DOCUMENTS

| | | |
|---|---|---|
| EP | 0 384 758 A2 | 8/1990 |
| EP | 0 431 751 A1 | 6/1991 |
| EP | 0 567 217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |

OTHER PUBLICATIONS

Moussaui and Shah, "Improving Multicast Performance for Input Queued Crossbar Cell Switches," Jun. 4, 1998.

Allen, M., Novell IPX Over Various WAN Media (IPXWAN), Network Working Group, RFC 1551, Dec. 1993, pp. 1–22.

Becker, D., "3c589.c: A 3c589 EhterLink3 ethernet driver for linux," becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

(List continued on next page.)

*Primary Examiner*—Frank Duong
*Assistant Examiner*—Kevin C. Harper
(74) *Attorney, Agent, or Firm*—Cesari and McKenna, LLP

(57) ABSTRACT

The invention includes a way to route multicast traffic through a switch or other device that uses input queuing. Basis vectors are associated with each virtual queue, which in a preferred embodiment are multicast virtual output queues (MVOQs). Each incoming flow is allocated to the MVOQ whose basis vector is closest to the destination vector of the incoming flow, creating queues whose contents are distinct from each other in terms of destination addresses of the flows in the respective queue. To optimize for traffic encountered basis vectors can be chosen using vector quantization methods. Basis vectors can be set statically or can be selected and updated dynamically, responsive to the traffic encountered or as set by an operator. The invention can reduce the number of virtual queues required for a given incremental improvement in performance or can improve performance for a given number of virtual queues.

83 Claims, 6 Drawing Sheets

SAMPLE FLOW TABLE FOR 4 OUTPUT QUEUES

| DESTINATION VECTOR | OUTPUT QUEUE | NUMBER OF CELLS IN QUEUE |
|---|---|---|
| 1010 | 1 | 1 |
| 0010 | 2 | 1 |
| 0100 | 3 | 3 |
| 0001 | 4 | 2 |
| 0110 | 1 | 1 |

U.S. PATENT DOCUMENTS

| | | |
|---|---|---|
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasiraj et al. |
| 4,965,772 A | 10/1990 | Daniel et al. |
| 4,970,678 A | 11/1990 | Sladowski et al. |
| 4,979,118 A | 12/1990 | Kheradpir .................. 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,040,176 A * | 8/1991 | Barzilai et al. ............. 370/422 |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. ............. 370/94.1 |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,299,260 A | 3/1994 | Shaio |
| 5,303,383 A * | 4/1994 | Neches et al. ................ 712/43 |
| 5,305,311 A | 4/1994 | Lyles |
| 5,307,343 A | 4/1994 | Bostica et al. |
| 5,309,437 A | 5/1994 | Perlman et al. .......... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,402,415 A | 3/1995 | Turner |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema ................... 270/94.1 |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. ................ 370/94.1 |
| 5,485,455 A | 1/1996 | Dobbins et al. |
| 5,490,140 A | 2/1996 | Abensour et al. .......... 370/60.1 |
| 5,490,258 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweasey |
| 5,509,006 A | 4/1996 | Wilford et al. |

| | | |
|---|---|---|
| 5,517,494 A | 5/1996 | Green |
| 5,519,704 A | 5/1996 | Farinacci et al. |
| 5,519,858 A | 5/1996 | Walton et al. ............... 395/600 |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. ................ 370/60 |
| 5,541,911 A | 7/1996 | Nilakantan et al. ........... 370/13 |
| 5,546,370 A | 8/1996 | Ishikawa ................... 369/77.2 |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Cherukuri et al. ..... 395/200.13 |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,634,010 A | 5/1997 | Ciscon et al. |
| 5,638,359 A | 6/1997 | Peltola et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. ......... 340/827 |
| 5,684,797 A | 11/1997 | Aznar et al. |
| 5,687,324 A | 11/1997 | Green et al. |
| 5,689,505 A * | 11/1997 | Chiussi et al. ............... 370/388 |
| 5,689,506 A | 11/1997 | Chiussi et al. |
| 5,694,390 A | 12/1997 | Yamato et al. |
| 5,724,351 A | 3/1998 | Chao et al. |
| 5,748,186 A | 5/1998 | Raman |
| 5,748,617 A | 5/1998 | McLain, Jr. |
| 5,754,547 A | 5/1998 | Nakazawa |
| 5,802,054 A | 9/1998 | Bellenger .................... 370/401 |
| 5,835,710 A | 11/1998 | Nagami et al. .......... 395/200.8 |
| 5,854,903 A | 12/1998 | Morrison et al. |
| 5,856,981 A | 1/1999 | Voelker ..................... 371/20.1 |
| 5,892,924 A | 4/1999 | Lyon et al. ............. 395/200.75 |
| 5,898,686 A | 4/1999 | Virgile |
| 5,898,687 A | 4/1999 | Harriman et al. |
| 5,903,559 A | 5/1999 | Acharya et al. |
| 5,959,989 A | 9/1999 | Gleeson et al. |
| 5,974,501 A | 10/1999 | Shaver et al. |
| 6,049,546 A * | 4/2000 | Ramakrishnan ............. 370/396 |
| 6,055,364 A | 4/2000 | Speakman et al. |
| 6,115,462 A | 9/2000 | Servi et al. |
| 6,188,698 B1 | 2/2001 | Galand et al. |
| 6,212,181 B1 | 4/2001 | Divivier |
| 6,212,182 B1 | 4/2001 | McKeown |
| 6,216,167 B1 * | 4/2001 | Momirov .................... 370/229 |
| 6,243,360 B1 * | 6/2001 | Basilico ..................... 370/231 |
| 6,295,285 B1 | 9/2001 | Whitehead |
| 6,320,861 B1 * | 11/2001 | Adam et al. ............. 370/395.7 |
| 6,335,939 B1 | 1/2002 | Hanna et al. |
| 6,351,466 B1 * | 2/2002 | Prabhakar et al. .......... 370/413 |
| 6,449,283 B1 * | 9/2002 | Chao et al. ................. 370/445 |
| 6,501,754 B1 * | 12/2002 | Ohba et al. ................. 370/389 |
| 6,603,772 B1 * | 8/2003 | Moussavi et al. ........... 370/432 |
| 2001/0050916 A1 | 12/2001 | Krishna et al. |

OTHER PUBLICATIONS

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point-to-Point Protocol," Network Working Group, RFC 1547, Dec. 1993, pp. 1–19.

Simpson, W., "The Point-to-Point Protocol (PPP)," Network Working Group, RFC 1548, Dec. 1993, pp. 1–53.

Tsuchiya, P.F., "A Search Algorithm for Table Entries with Non-Contiguous Wildcarding," Abstract, Bellcore.

Zhang, et al., "Rate-Controlled Static-Priority Queuing," INFOCOM 1993, pp. 227–236.

* cited by examiner-

SAMPLE FLOW TABLE FOR 4 OUTPUT QUEUES

| DESTINATION VECTOR | OUTPUT QUEUE | NUMBER OF CELLS IN QUEUE |
|---|---|---|
| 1010 | 1 | 1 |
| 0010 | 2 | 1 |
| 0100 | 3 | 3 |
| 0001 | 4 | 2 |
| 0110 | 1 | 1 |

FIG. 2

MULTICAST ROUTING WITH NEAREST QUEUE FIRST ALLOCATION AND DYNAMIC AND STATIC VECTOR QUANTIZATION

RELATED APPLICATIONS

This invention relates to U.S. patent application: application Ser. No. 09/282,539, in the name of Farshid Moussavi and Dhaval N. Shah, titled "Multicast Routing With Multicast Virtual Output Queues And Shortest Queue First Allocation," assigned to the same assignee. The application is hereby incorporated by reference as if fully set forth herein.

It is respectfully suggested that it may be appropriate for the same examiner to examine both applications.

BACKGROUND OF THE INVENTION

1. Field of the Invention

This invention relates to multicast routing.

2. Related Art

Communication on a computer network is accomplished by sending messages. Messages can include one or more data packets. Packets can be of fixed or variable lengths. Cells are packets having a fixed length.

Messages have a source and at least one destination address. A computer network includes devices that direct traffic towards the destination address. A switch is one such device.

Switches have multiple input interfaces and multiple output interfaces, which may be connected in a variety of ways. A cross bar switch is designed so that every input interface can be connected to every output interface.

There are two types of network traffic. In the first type a message has only one final destination address. This is known as unicast traffic. One use of unicast traffic is point to point communication between two computers. In the second type of traffic, called multicast, a message is sent to multiple destinations. One use of multicast transmissions is when a computer user wishes to send a message over the Internet to many individuals wishing to receive the message. A switch can have both unicast input interfaces as well as multicast input interfaces; often an interface handles both unicast as well as multicast traffic.

Memory Bandwidth Limitations

There are two main types of schemes for storing messages in the known art, which are input queuing and output queuing. (Combinations are also possible). In input queuing, a packet is queued before it enters the crossbar switch, and waits in line to arrive at the head of the input queue and be sent onward to its destination across the crossbar fabric. In output queuing, packets are forwarded onto the crossbar fabric from the input interface immediately, and queued up as they arrive at their destination output.

Output queuing hits limitations in memory speed faster than does input queuing because output queuing requires a memory at the output which is capable of momentarily receiving traffic from multiple inputs (in the worst case, all inputs), and sending out traffic at the output line rate. This means the memory in an output queued scheme must be faster than the memory in an input queued scheme by a factor equal to the number of interfaces.

In order to improve efficiency and thus the general performance in the case of high performance systems, it is preferable to use input queuing to accommodate the limited memory speeds available. The following description of the Head of Line Blocking problem assumes an input queued system.

Head of Line Blocking Problem

A unicast message, having only one destination, only needs to be routed to one output interface of a switch. Messages may be simply queued in the order received until they can be transmitted through the selected output interface. A problem in the known art occurs when the message at the head of a first queue is to be sent to an output interface that is not available due to a message from another queue using the output interface. The first queue is blocked until the particular output interface is available; no messages from this queue can be sent until the first element in the queue, or "head element", is cleared by being sent across the switch to the output interface. (The queue may be implemented with each element being a single packet or cell, or may be implemented with each element including all the packets or cells that make up a single message). If the output interface is busy for an extended period, several queues may become blocked. This is known as the Head-of-Line blocking ("HOL blocking") problem.

A known technique for approaching the HOL blocking problem for unicast traffic is the use of virtual output queues ("VOQs"). VOQs are virtual (logical) queues maintained in software or hardware; each VOQ is associated with a physical interface. There is a one-to-one correspondence between the VOQs and possible input/output combinations. The number of VOQs needed scales arithmetically as M×N, where M and N are the number of output interfaces and input interfaces, respectively. For a crossbar switch with 16 unicast input interfaces and 16 output interfaces, commonly called a "16×16" switch, 256 VOQs are need. If a particular output interface is tied up, a virtual queue associated with some other output interface can still send messages to that other output interface.

It should be noted that although the term used is "virtual output queue", the method is actually an input queued method, as the queues are maintained for each input interface.

The VOQ method has the drawback that it only applies to unicast routing. VOQs cannot be applied to multicast routing because for multicast the number of VOQs needed to accommodate all possible input/output combinations is prohibitively large, growing exponentially as $2^M \times N$, where M is the number of output interfaces and N is the number of multicast input interfaces. For a switch with 2 input interfaces and 16 output interfaces, a total of $2 \times 2^{16}$ (approximately 130,000) virtual queues would be required to implement VOQs. Very large numbers of VOQs use valuable resources such as memory and chip real estate, and likely cannot fit on a single chip using current technology.

For multicast routing, it is disclosed in the above referenced, co-pending application, "Multicast Routing with Multicast Virtual Output Queues and Shortest Queue First Allocation", to use multicast virtual output queues ("MVOQs") to reduce Head-of-Line blocking and improve performance. MVOQs are virtual queues maintained for an input interface having multicast capability. The number of MVOQs is fewer than the $2^M$ possible destination vectors for a multicast message. Because of this lack of a one-to-one correspondence between MVOQs and destination vectors, it is not possible to simply maintain dedicated queues as in the unicast/VOQ case where, for each input interface, a VOQ is dedicated to each output interface. Consequently, the problem of assigning incoming flows of messages to the limited number of MVOQs available must be solved.

The use of Shortest Queue First (SQF) Allocation to assign flows is also disclosed in the above referenced, co-pending application, "Multicast Routing with Multicast Virtual Output Queues and Shortest Queue First Allocation". SQF allocation is intelligent and provides improved performance. However, SQF does not always provide optimal performance. SQF is responsive to the length of the virtual queues but is not directly responsive to, and cannot be customized for, characteristics of the traffic encountered or characteristics of the flows that are already in the queues.

Allocation of flows in such a manner as to improve performance for some kinds of traffic, such as non-uniformly distributed, long-lived, and bursty flows, continues to be a problem. Allocation of flows that can be customized to the traffic is desirable. Multicast transmissions are increasingly common and HOL blocking is an ongoing problem. It will become increasingly common for traffic on networks to be bursty and non-uniform due to increasing popularity of videoconferencing, IP telephony, and other long-lived communications.

Accordingly, it would be advantageous to be able to route multicast transmissions using virtual queues in a manner that further reduces HOL blocking, improves system performance, and can be adjusted for different traffic patterns.

This advantage is achieved in the invention in which vectors, called basis vectors, are associated with virtual queues and multicast flows are assigned to the nearest queue first, producing virtual queues that are distinct from each other in terms of the characteristics of the elements in the queue. Distance is measured as described in the Detailed Description below. In a preferred embodiment, vector quantization methods are used to determine the basis vectors to optimize for the traffic pattern encountered. One embodiment of the invention uses an extension of the Lloyd Max Quantizer to carry out the vector quantization.

SUMMARY OF THE INVENTION

The invention includes a way to route multicast traffic through a switch or other device that uses input queuing. Basis vectors are associated with each virtual queue, which in a preferred embodiment are multicast virtual output queues (MVOQs). Each incoming flow is allocated to the MVOQ whose basis vector is closest to the destination vector of the incoming flow, creating queues whose contents are distinct from each other in terms of destination addresses of the flows in the respective queue. To optimize for traffic encountered basis vectors can be chosen using vector quantization methods. Basis vectors can be set statically or can be selected and updated dynamically, responsive to the traffic encountered or as set by an operator. The invention can reduce the number of virtual queues required for a given incremental improvement in performance or can improve performance for a given number of virtual queues.

BRIEF DESCRIPTION OF THE DRAWINGS

FIG. 2 is a diagram of a flow table.

DETAILED DESCRIPTION OF THE PREFERRED EMBODIMENT

In the following description, a preferred embodiment of the invention is described with regard to preferred process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

Related Applications

Inventions described herein can be used in combination or conjunction with inventions described in the following patent application:

application Ser. No. 09/282,539, in the name of Farshid Moussavi and Dhaval N. Shah, titled "Multicast Routing With Multicast Virtual Output Queues And Shortest Queue First Allocation," assigned to the same assignee. The application is hereby incorporated by reference as if fully set forth herein.

Overview of the Invention

Figure 1:
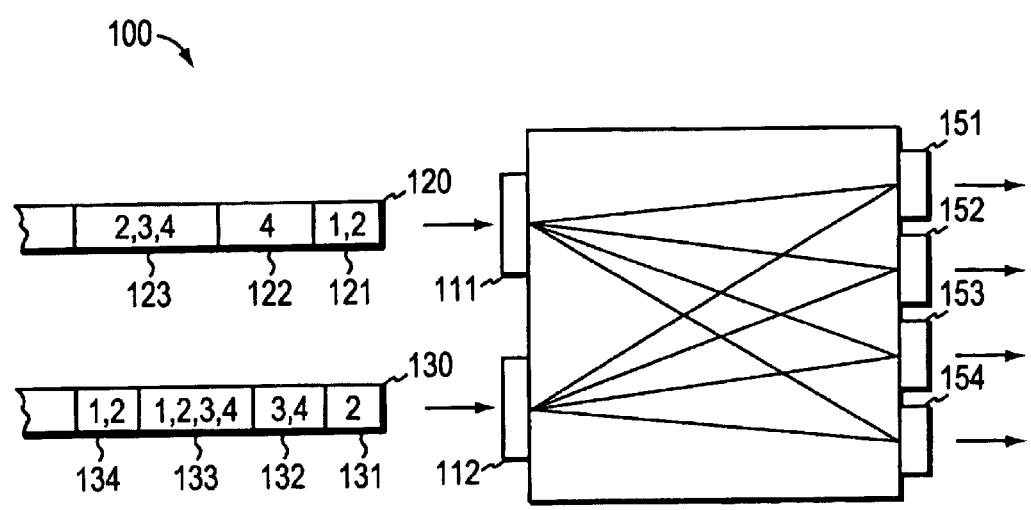
FIG. 1 is a diagram of a crossbar switch with 2 input interfaces and 4 output interfaces, with messages in a queue for each input interface.

Packets, which are cells in the preferred embodiment, arrive at an input interface of a switch. The switch routes network traffic to the appropriate destination(s). FIG. 1 is a diagram 100 of a cross bar switch having two input interfaces 111, 112 and four output interfaces 151–154. Input queues 120, 130 contain messages for respective input interfaces 111, 112. For convenience, in FIG. 1 each message is depicted as a single entry in the queue although each cell in a message is processed and queued separately, as discussed below, and the cells of different messages may arrive at the input interleaved. The messages in input queues 120, 130 are destined for various combinations of output interfaces. Each message may include one or more packets. The destination output interfaces for each message in the input queues 120, 130 are indicated by the sets of numbers shown in the schematic depiction of the entries in the queues 121–123, 131–134.

For a switch having M output interfaces, there are $2^M$ possible destination address combinations. But, the number of MVOQs available to a multicast input interface is limited and is less than $2^M$. An allocation policy maps any one of the $2^M$ destination vectors to one of the MVOQs.

It is desirable for the set of multicast groups of the messages in each MVOQ to have as few destinations in common as possible with the set of multicast groups of the messages in other MVOQs, thereby reducing delays due to conflicts at the destinations.

In the invention, a vector, called a basis vector, is associated with each MVOQ. The first aspect of the invention is that incoming flows are assigned to the queue whose basis vector is closest to the flow's destination vector, measured as described below. This is called Nearest Queue First ("NQF") allocation.

The basis vectors can be chosen by any means; however, a second aspect of the invention is to choose the basis vectors to minimize the sum of the distances for all queues between the destination vectors of the cells in the incoming flows that are assigned to each queue and the respective queue's designated basis vector (which is usually reflective of the destination vectors of cells in that queue so far.) In a preferred embodiment, vector quantization methods are used to select the best basis vectors.

Cell-based Network with Crossbar Switch, non-Global MVOQs, and Modified Lloyd-Max For clarity, the invention is described as used in a crossbar switch having one multicast input interface and 16 output interfaces, in a network using cell-based messages. It is to be understood that the invention may be applied to sizes other than 16-output interface crossbar, to switches having both unicast as well as multicast input interfaces, and to switches other than cross bar switches. It is further to be understood that the invention may be applied to data transmissions other than cell-based transmission.

The invention is described for MVOQs associated with a single multicast input interface. It is to be understood that the invention can be practiced with multiple multicast input interfaces. In addition, the invention can be practiced with global MVOQs (associated with multiple multicast input interfaces) which are disclosed in the above-referenced, co-pending application, "Multicast Virtual Output Queued Multicast Routing With Shortest Queue First Allocation". With global MVOQs, for a message arriving at a multicast physical input interface, the Nearest Queue First allocation and if desired the vector quantization analysis is performed across all MVOQs and the choice of MVOQ is made based on that analysis. If the desired MVOQ is associated with a second multicast physical input interface, the message may be sent to that input interface to be queued in that MVOQ.

The invention can be applied to any input-queued system, such as those not using crossbar switches, and these alternatives are within the scope and spirit of the invention.

The invention is described using vector quantization to determine the basis vectors. Vector quantization is used because it optimizes (by minimizing) the sum of distance of the incoming destination vectors from the basis vector associated with the MVOQ to which each incoming destination vector is assigned. However, basis vectors can be chosen by any means. The basis vectors preferably span the space spanned by the destination vectors, but need not do so.

An extension of the Lloyd Max quantizer is used to perform the quantization. It is to be understood that the invention can be practiced with other methods of quantizing. Such methods are known in the art of mathematics. It is further to be understood that the invention can be practiced with combinations of allocation policies, such as in combination with Shortest Queue First allocation.

The invention is described with the basis vectors in the continuous bitmap subspace, as described below. However, the invention can also be practiced with the basis vectors in the discrete bitmap subspace.

The preferred embodiment is described with dynamic updating of the MVOQ basis vectors and a fixed value for the centroid weight and fixed window length. Alternatively the invention can be practiced with the centroid being implemented by updating each element of the basis vector to be the centroid of the corresponding element of the basis vector and the element of each incoming destination vector in the window. Calculating a centroid is known in the art of linear algebra. Alternatively and additionally, the window length can be varied, such as by action by an operator or in response to traffic.

The invention alternatively can be practiced with static basis vectors or with basis vectors that are updated according to some external criteria. For example, an operator can set a basis vector to a specific destination address, in response to the information that a large volume of traffic is expected for that address. The basis vectors can be initialized to have predetermined values that are known to perform well for expected traffic patterns.

Implementation of dynamic updating of basis vectors is described below. To implement static basis vectors, the steps related to updating the basis vectors are skipped. In some embodiments static basis vectors are preferred due to the increased ease of implementation.

As noted in the above referenced, co-pending application, "Multicast Virtual Output Queued Multicast Routing With Shortest Queue First Allocation", MVOQs can be used in conjunction with VOQs.

Cell-based means messages consist of one or more data packets of a fixed length.

Terminology

A multicast message is directed to multiple destinations. The "multicast destination vector" or "destination vector" stores the output interfaces for a given message. M is the number of output interfaces in the switch and the vector can be implemented as an M-bit bitmask. Each destination address combination can be represented by an M-bit vector; setting a bit to 1 indicates the message is to be sent to the corresponding output interface. (A broadcast message is treated as having all bits set.) For instance, a switch having 4 output interfaces has 16 possible destination address combinations; a destination vector of [0,1,1,0] means that the message should be sent to output interfaces 1 and 2, but not to output interfaces 0 or 3, in a switch where the four output interfaces are numbered 0, 1 ,2 , and 3.

A broadcast message is a multicast message. The broadcast message may have a special destination address, or an address where all bits in the destination vector are set. A broadcast message is treated as though all bits in the destination vector are set.

The "residue" of two destination vectors is the intersection of their set of outputs; that is, the destination output interfaces they have in common.

A "multicast flow" is a stream of packets, with the same multicast destination vector. A flow is defined as a "new flow" if no packets with that flow's destination vector exist in any of the multicast virtual output queues at the time of its arrival. Note this is not the same as a TCP flow or other flow pertaining to higher layers. The term "flow" used by itself below refers to a multicast flow.

Two flows are "non overlapping flows" if their destination vectors do not both have a bit set in any location of their destination bitmask. That is, the flows do not share any common output interface.

Relation of Message to Flows

A message includes one or more data packets, which are preferably cells (fixed-length packets). A message can be one flow. If the transmission of a message is interrupted for a length of time, a message can give rise to multiple multicast flows, as defined above. However, at the time of handling by the switch, a flow that comprises a complete message is handled the same as a flow that is one of several flows comprising a message.

Grouping of Flows

The cells in a multicast flow are preferably assigned to the same multicast virtual output queue.

Assigning the cells in one multicast flow to different multicast virtual output queues would increase the chance that the head elements of two queues will be the same, resulting in HOL blocking, and is therefore undesirable in most circumstances. In addition, assigning a flow to one queue assures that the cells in the flow retain their ordering; that is, the cells will not arrive at the destination out of order, as might happen if flows were split between different queues. Note that through its lifetime a TCP flow could be assigned to different queues.

Number of MVOQs

As disclosed in the above-referenced, co-pending application, "Multicast Routing With Multicast Virtual Output Queues and Shortest Queue First Allocation", for a switch with 16 outputs, there are preferably eight MVOQs. We describe the allocation method of the current invention for 8 MVOQs in a switch having 16 outputs.

Distance Between Two Vectors, Discrete Bitmap Space, Continuous Bitmap Space

In traditional vector quantization, distance corresponds to distortion of a signal. In the current invention, the distance between two vectors is related to residue.

Distance is the square of the traditional Euclidean |E1| distance. The traditional Euclidean |E1| distance is the square root of the sum of the squares of the difference for each element, i.e. for vectors $\vec{a}$ and $\vec{b}$ of length N the Euclidean |E1| distance is $$\left(\sum_{i=1}^{N}(a_i-b_i)^2\right)^{1/2}$$

Alternatively, the Euclidean |E1| distance could be used, but it requires the taking of a square root, which is computationally expensive. Because the parameter of interest is the relative distance we instead use the square of the Euclidean |E1| distance. Other measures of relative distance can be used, such as those known in the art of signal processing. Distance is preferably calculated in a Content Addressable Memory (CAM).

A discrete bitmap vector is a vector where every element is either 0 or 1. The discrete bitmap subspace is the subspace spanned by all discrete bitmap vectors. Because every element is 0 or 1, the distance between two discrete bitmap vectors turns out to be the number of positions where their elements are different. For a discrete bitmap vector of length L, the largest possible distance is L. For instance, the distance between the 6-bit vectors [1,0,0,0,0,0] and [0,1,0,0,0,0] is 2 because the vectors differ in the first and second positions. As another example, the distance between [1,1,0,0,0,0] and [1,1,1,1,1,1] is 4, because the vectors differ in positions 2–5 (and are the same in positions 0 and 1).

Destination vectors are discrete bitmap vectors. In an alternative embodiment, basis vectors are also discrete bitmap vectors.

The continuous bitmap subspace is the subspace spanned by vectors where every element is in the interval [0,1]. That is every element is equal to or greater than 0 and equal to or less than 1. Again, the maximum distance between two vectors of length L, is L.

Basis vectors are in the continuous bitmap subspace in the preferred embodiment.

Note that distance is not the scalar product or the overlap: every vector would have maximum overlap with the broadcast vector if this were the measure.

Choice of Basis Vectors

In the art of mathematics it is known to map from J-dimensional space to K-dimensional space. Mapping associates any point in J-space (i.e. the endpoint of a vector of dimension J) with a point in K-space (i.e. the endpoint of a vector of dimension K).

The K-subspace is spanned by k basis vectors. The set of k basis vectors is called a codebook. Methods for codebook design are known in the art of mathematics. At any given time, in the invention the incoming destination vectors received span k dimensions, with k<=16 (the number of output interfaces); and the MVOQ basis vectors span at most 8-dimensions (the number of basis vectors). Depending on the circumstances, at any given point in time, the 8 basis vectors may not necessarily span 8-dimensions. For instance, if all initial vectors are only to output interfaces 1 and 2, the basis vectors may only span 2-space.

A better codebook results in better grouping of cells based on their destination vectors and ultimately smaller residue.

Static basis vectors can be chosen in numerous ways. One way to choose basis vectors would simply be to choose the 8 most frequently encountered destination vectors.

The 8 preferred basis vectors may be orthogonal or non-orthogonal. In the preferred embodiment the vectors are allowed to be non-orthogonal. Non-orthogonality leads to more flexible response to traffic patterns and also enables recalculation of basis vectors to occur independently of each other. That is, each MVOQ basis vector can be updated independently.

It is desired to minimize the sum of the distances of the incoming vectors from the basis vector of the queue to which each incoming vector is assigned. Choosing the best set of basis vectors, or codebook, by examining every combination of basis vectors against an incoming training stream of destination vectors is impractical due to the large number of possible combinations. However, heuristic codebook design, which is faster than an exhaustive search, and which results in near optimal code books, is known in the art of mathematics.

In the preferred embodiment, determination of basis vectors is done using the Lloyd Max Quantizer method of vector quantization, modified as described below. The use of the Lloyd Max Quantizer to heuristically determine a codebook is known in the art of mathematics.

In standard Lloyd Max quantizing, the codebook is restricted so that each component of the basis vectors is in the closed interval [−R,R]. In the preferred embodiment the Lloyd Max Quantizer is modified in the following ways: the codebook is restricted so that each component of every vector is in the closed interval [0,1]; i.e. each component is greater than or equal to 0 and less than or equal to 1. We refer to such vectors as being in the continuous bitmap subspace. In the preferred embodiment a vector is stored as an array of non-negative integers. These integers are normalized to be in the interval [0,1] and quantized for storage, to the precision available, as a fixed point number. (Alternatively the vectors can be stored as arrays of fixed point or floating point numbers, or by other known means.)

In an alternative embodiment the codebook is restricted to that each component of every vector is in the set {0,1}, i.e. every component is either 0 or else is 1 (and none are negative). One way to implement this embodiment is to take the vector in the preferred embodiment (i.e. the continuous bitmap subspace), and for each element of the vector round the value down to 0 if the element is less than 0.5 or up to 1 if it is greater than or equal to 0.5.

Queuing a Cell

In the preferred embodiment, for each queue, counts are kept of the number of cells having a specific destination vector for each destination vector for which there is a cell in the queue. An entry showing the output queue to which the destination vector is assigned is also kept for each destination vector in the queue. This information can be kept in a flow table. A diagram of an example flow table is shown in FIG. 2. In the preferred embodiment, the table is implemented in lookup table in a Content Addressable Memory (CAM).

Figure 3A:
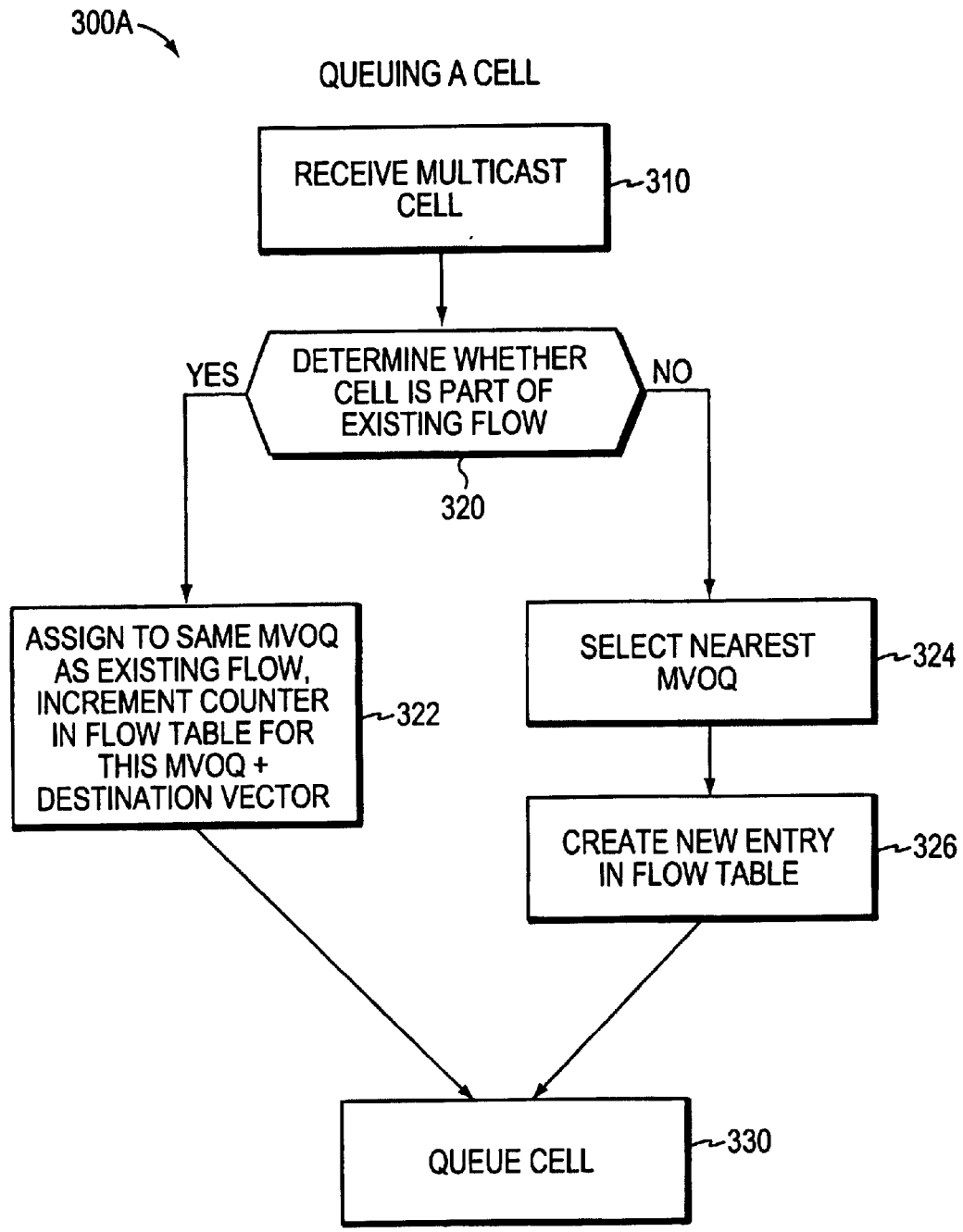
FIG. 3A is a process flow diagram of queuing a cell.

FIG. 3A is a process flow diagram 300A for queuing a cell. Once a multicast message is received 310, an MVOQ is selected. Preferably, VOQs are maintained for unicast messages. However, a unicast message may be treated as multicast with a single destination. To select an MVOQ, it is determined whether the cell is part of an existing multicast flow 320 as defined above. This is done by checking the multicast destination vector against the entries in the flow table.

If a matching entry is found, the cell is assigned to the same MVOQ as the entry and the counter in the flow table for that destination vector is incremented 322. If a matching entry for that destination vector is not found in the flow table, the cell is the first cell in a new flow as defined above. The MVOQ with the basis vector closest to the destination address (Nearest Queue First) is selected 324. A new entry in the flow table is created for this destination vector with the cell count for the entry equal to unity 326.

Once the MVOQ is selected, in a preferred embodiment the cell is queued 330 by causing the tail element of the queue to point to the cell. The cell is set to have a null pointer in the node that is reserved to point to the next element. MVOQs are preferably maintained as linked lists with a node pointing to the next cell in the queue, with the last cell in the queue having a null pointer. There is a pointer to the head of each queue. A pointer to the tail of the queue is also maintained. In a preferred embodiment, these queues are implemented in hardware.

Updating the Basis Vectors

In the preferred embodiment the MVOQ codebook (set of 8 basis vectors), are updated dynamically. The basis vectors can be adjusted in response to the traffic encountered. A process flow diagram 300B for updating the set of basis vectors is shown in FIG. 3B.

Figure 3B:
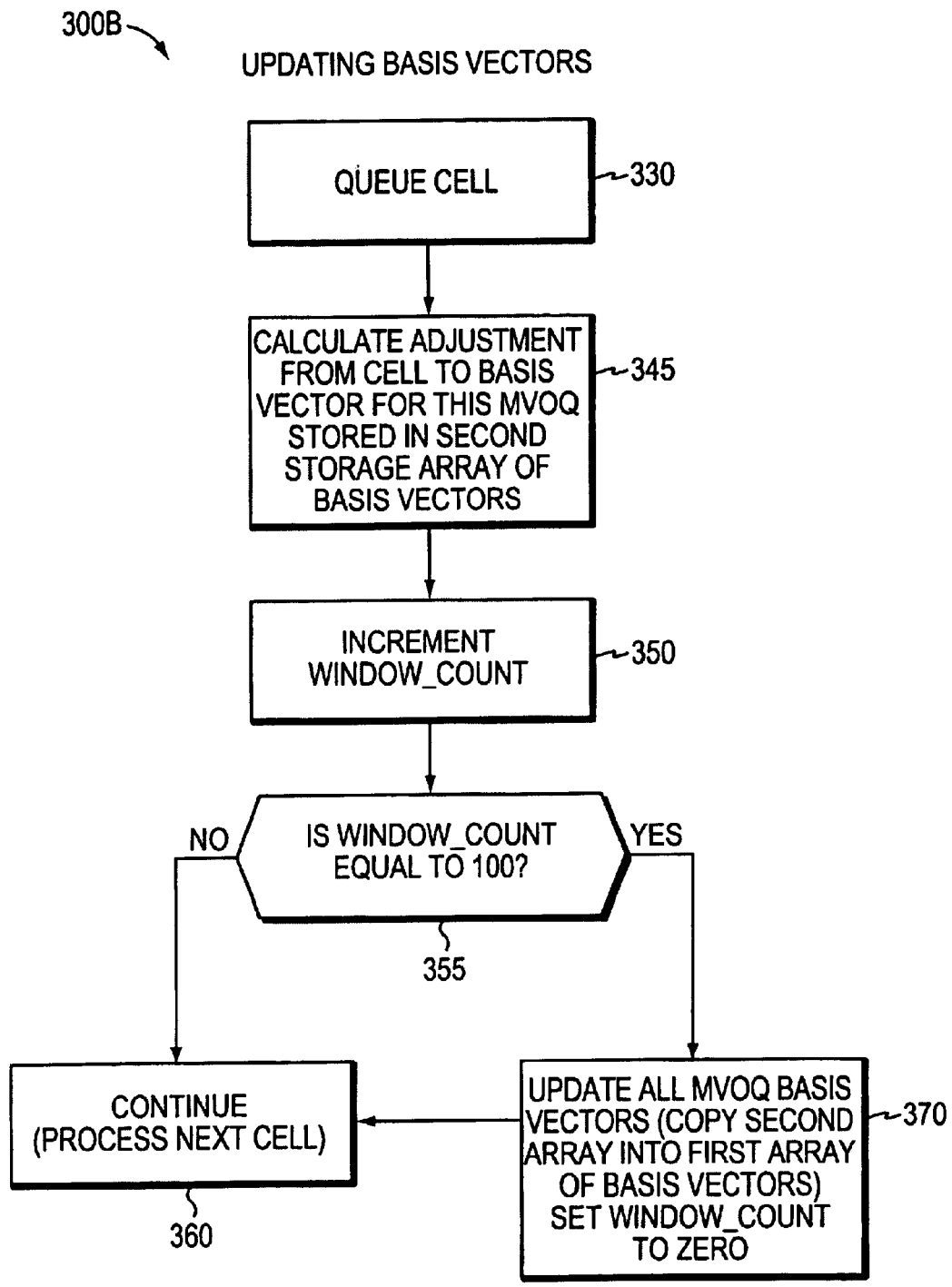
FIG. 3B is a process flow diagram of updating the basis vectors for a window of incoming cells.

At an initial time not shown in FIG. 3B, preferably the 8 basis vectors are initially set to be an arbitrary subset of the destination vectors of incoming flows, such as the first 8 unique destination vectors. They can alternately be set to arbitrary values, random values, predetermined values, or other values. The initial values of the basis vectors are stored in an array, and a copy of the initial basis vectors are stored in a second storage array.

Also at an initial time not shown in FIG. 3B, a counter that keeps track of the number of cells processed is initialized to a value of zero (called "window_count" in FIG. 3B).

After a cell is queued 330, the adjustment to the basis vector for the selected MVOQ due to this cell is calculated and the adjusted basis vector stored in the second storage array 345. The counter of cells processed (window_count) is incremented 350. If the counter indicates the window length (100 in the preferred embodiment) has been reached since the basis vectors were last updated 355, all the basis vectors are updated, by copying the adjusted basis vectors stored in the second storage array onto the basis vector array 370, and the window_count counter is reset to zero 370. The process continues on to process the next cell 360.

In an alternative embodiment, the MVOQ vectors are not updated but have static values. The static values for the various MVOQ vectors are preferably set to values that are known to perform well with the expected traffic or are otherwise desirable. For example, the 8 static basis vectors can be chosen to be the 8 basis vectors resulting from a dynamic training exercise on simulated or real traffic. Or, one of the basis vectors can be set to be the broadcast vector.

Figure 3C:
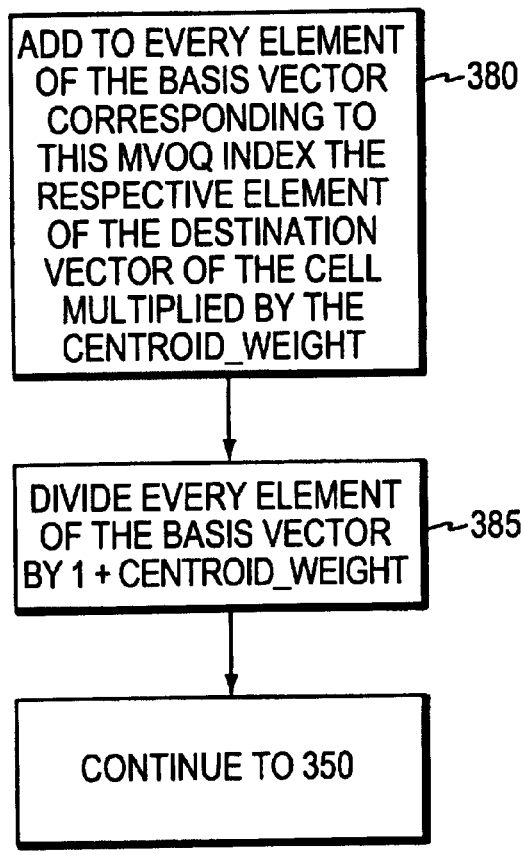
FIG. 3C is a process flow diagram of calculating the adjustment to a basis vector from one cell.
Figure 4:
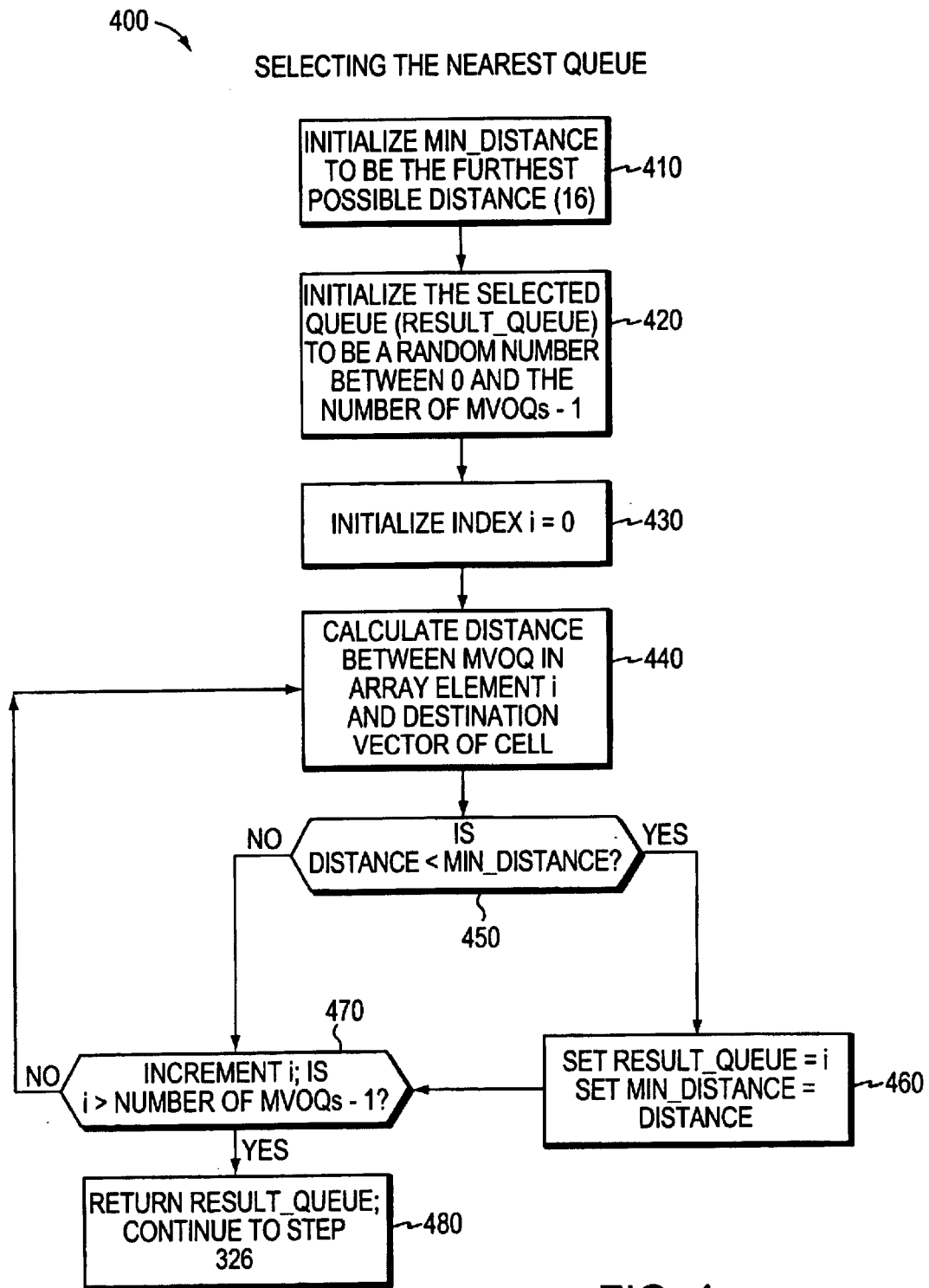
FIG. 4 is a process flow diagram of selecting the nearest MVOQ.

Updating an MVOQ vector for one input interface 345, using a fixed centroid weight, is illustrated in the pseudo code below and in FIG. 3C. Using a fixed centroid weight reduces calculation time and controls the rate at which change occurs.

```
UpdateMVOQVector(MVOQ_vectors, received_vector, input, MVOQ):
At each arrival: {
    MVOQ_vectors[MVOQ] = MVOQ_vectors[MVOQ]
        + centroid_weight*received_vector;
    MVOQ_vectors[MVOQ] = MVOQ_vectors[MVOQ] / (1 +
        centroid_weight);
    return( MVOQ_vectors[MVOQ]);
}
``` where the variable "MVOQ" is the index of the virtual queue to which the incoming message is assigned. The variable "received_vector" is the destination vector of the incoming message, and the multiplication of the received vector by the centroid weight indicates multiplication of every element of the destination vector by the scalar centroid weight 380. The value 1+centroid_weight is similarly a scalar value and the division by this value indicates division of every element of the array in the numerator by this value 385. Vector addition is otherwise implied. This pseudo code applies to the preferred continuous bitmap embodiment and also can be applied to the alternative discrete bitmap embodiment.

Alternatively, instead of using a fixed centroid weight the actual centroid of the MVOQ basis vector and the destination vector can be used. Calculation of the centroid of two vectors is known in the art of mathematics.

In the preferred embodiment the centroid weight is fixed to be 0.1. The window size is fixed at 100. These numbers work well for bursty traffic with geometrically distributed burst lengths with an average length of 10 packets, which is similar to traffic currently encountered on the Internet.

Choosing the Closest MVOQ

Each incoming new flow to the input interface is assigned to the MVOQ having the basis vector closest to the destination vector of the flow. The steps taken to choose an MVOQ are shown in process flow diagram 400 and can be illustrated in pseudo code. This pseudo code applies to the preferred embodiment, and also can be applied to the discrete bitmap alternative embodiment.

```
Allocate(new_vector, queue_vectors) {
    min_distance = J;
    result_q = uniform_random[0,J-1];
    for (i=0; i<j; i++) {
        if (distance( new_vector, queue_vectors[i] < min_distance) {
            min_distance = distance(new_vector, queue_vectors
                [(i+j)modJ]);
            result_q = i;
        }
    }
    return (result_q);
} /*end of Allocate*/
``` where J is the number of output interfaces. The minimum distance, min_distance, is initialized to be the furthest possible distance, J 410. The furthest possible is 16 in the preferred embodiment.

In the preferred embodiment, when there is more than one MVOQ having the same smallest distance, the MVOQ is chosen randomly from among these equidistant and closest MVOQs. The choice is randomized by initializing the index of the starting MVOQ index randomly 420.

A place-holding, current index is initialized to be the index of the first MVOQ 430. The distance between the basis vector of this current MVOQ indicated by the current index, and the destination vector of the cell is calculated 440, and if the distance is less than the current minimum distance found (min_distance) 450, the nearest queue variable (result_queue) is set to be this queue and the current minimum distance is set to be this distance 460. The distance is calculated for all queues 440–470, and the final result_queue that is the nearest queue is returned 480.

Sending a Message

Messages are sent as disclosed in the copending, above-referenced application, "Multicast Routing With Multicast Virtual Output Queues and Shortest Queue First Allocation", which is incorporated by reference above.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method for handling multicast flows in a switching device comprising:

receiving a multicast message at an input interface, where said multicast message has an associated destination vector;

associating a basis vector with each multicast virtual output queue of a set of multicast virtual output queues, said set of multicast virtual output queues having more than one and less than $2^N$ individual multicast virtual output queues for said input interface, where N equals the number of individual output interfaces to which the said multicast message could be directed;

selecting a basis vector, as a selected basis vector, by comparing said destination vector of said multicast message with each said basis vector; and assigning said multicast message to a multicast virtual output queue associated with said selected basis vector.

2. A method as in claim 1 wherein said comparing involves determining a distance measure between said destination vector and each said basis vector.

3. A method as in claim 2 wherein said distance measure is a square of a Euclidean distance.

4. A method as in claim 2 further comprising:

calculating said distance measure using a content addressable memory.

5. A method as in claim 2 further comprising:

calculating said distance measure for destination vector $\vec{D}$ and basis vector $\vec{B}$ where both are of N dimensions, as $$\sum_{i=1}^{N}(d_i - b_i)^2.$$

6. A method as in claim 1 further comprising:

computing an updated basis vector in response to said destination vector of said multicast message.

7. A method as in claim 6 further comprising:

saving updated basis vectors in memory; and substituting said updated basis vectors for use as basis vectors in said associating step in response to expiration of a window count.

8. A method as in claim 6 further comprising:

computing said updated basis vector by the expression $$\vec{UB} = \frac{[\vec{SB} + (\vec{D} * CW)]}{(1 + CW)}$$

where $\vec{UB}$ is said updated basis vector, $\vec{SB}$ is said selected basis vector, $\vec{D}$ is said destination vector, and CW is a centroid weight.

9. A method as in claim 8 where CW=0.1.

10. A method as in claim 8 where CW equals the centroid of said selected basis vector and said destination vector.

11. A method as in claim 1 further comprising:

sending a head element of a multicast virtual output queue of said set of multicast virtual output queues to output interfaces.

12. A method of routing a packet having an associated destination vector, said packet arriving at an input interface of a switching device, including steps for:

establishing a set of multicast virtual output queues for said input interface;

determining whether said packet is part of an existing flow;

if said packet is part of an existing flow, assigning said packet to one of said set of multicast virtual output queues associated with said existing flow;

if said packet is not part of an existing flow, assigning said packet to one of said set of multicast virtual output queues responsive to said destination vector; and queuing said packet in said one multicast virtual output queue.

13. A method as in claim 12 wherein said step of assigning includes steps of:

if said packet is part of an existing flow, updating a flow table entry associated with said destination vector;

if said packet is not part of an existing flow, creating a flow table entry associated with said destination vector and said one multicast virtual output queues.

14. A method as in claim 13 including further steps of:

adjusting a copy of said basis vector associated with said one multicast virtual output queues;

incrementing a counter of a number of packets processed; and updating each said basis vector associated with each of said set of multicast virtual output queues in response to a comparison between said counter and said selected window length.

15. A method as in claim 12, including steps of:

updating said basis vector associated with said one multicast virtual output queueS.

16. A method as in claim 15 wherein said step of updating includes steps of:

replacing said basis vector with the centroid of said basis vector and said destination vector.

17. A method as in claim 15 wherein said step of updating includes steps of:

adjusting said basis vector by an amount calculated using a fixed centroid weight and said destination vector.

18. A method as in claim 17 wherein said basis vector includes elements and said destination vector includes elements, and wherein said step of adjusting includes steps for:

adding to each element of said basis vector the product of the respective each element of said destination vector and said fixed centroid weight;

dividing each element of said basis vector by the sum of unity and said fixed centroid weight.

19. A method as in claim 18 wherein said packet includes a single cell.

20. A method for routing a packet arriving at a multicast input interface of a switching device, said packet having an associated destination vector, including steps for:
    associating a basis vector with each multicast virtual output queue of a set of multicast virtual output queues to create a set of basis vectors;
    selecting a multicast virtual output queue responsive to a comparison of said destination vector with said set of basis vectors; and
    queuing said packet in said multicast virtual output queue.

21. A method as in claim 20 further comprising:
    computing an updated basis vector in response to said destination vector of said multicast message.

22. A method as in claim 21 further comprising:
    computing said updated basis vector by the expression $$\vec{UB} = \frac{[\vec{SB} + (\vec{D} * CW)]}{(1 + CW)}$$

where $\vec{UB}$ is said updated basis vector, $\vec{S}B$ is said selected basis vector, $\vec{D}$ is said destination vector, and CW is a centroid weight.

23. A method as in claim 22 further comprising:
    setting CW=0.1.

24. A method as in claim 22 further comprising:
    setting CW equal the centroid of said selected basis vector and said destination vector.

25. A method as in claim 21 further comprising:
    saving updated basis vectors in memory; and
    substituting said updated basis vectors for use as basis vectors in response to expiration of a window count.

26. A method as in claim 20 further comprising:
    determining a distance measure between said destination vector and each said basis vector in said comparing said destination vector with each said basis vector.

27. A method as in claim 36 further comprising:
    computing distance measure as a square of a Euclidean distance.

28. A method as in claim 26 further comprising:
    calculating said distance measure for destination vector $\vec{D}$ and basis vector $\vec{B}$ where both are of N dimensions, as $$\sum_{i=1}^{N} (d_i - b_i)^2.$$

29. A method as in claim 26 further comprising:
    calculating said distance measure using a content addressable memory.

30. A method for operating a switching device, said switching device having an input interface, said input interface having multicast capability, comprising:
    establishing a set of multicast virtual output queues for said input interface;
    choosing a set of basis vectors for said set of multicast virtual output queues;
    associating each basis vector of said set of basis vectors with a multicast virtual out-put queue of said set of multicast virtual output queues;
    receiving a message having an associated direction vector at said input interface;
    queuing said message in a multicast virtual output queue in response to a comparison between said direction vector and said set of basis vectors.

31. A method as in claim 30 wherein said set of basis vectors are in a continuous bitmap subspace.

32. A method as in claim 30 wherein said set of basis vectors are in a discrete bitmap subspace.

33. A method as in claim 30 wherein said set of basis vectors are substantially orthogonal.

34. A method as in claim 30 wherein the sum of a distance measure between said set of basis vectors and a set of destination vectors is minimized.

35. A method as in claim 30 wherein at least one of said basis vectors includes a broadcast vector.

36. A method as in claim 30 wherein said step of choosing includes using vector quantization methods.

37. A method as in claim 30 wherein said step of choosing includes using a modified Lloyd Max quantizer.

38. A method as in claim 30 wherein said step of choosing includes setting at least one of said basis vectors to be a predetermined vector.

39. A computer readable media comprising:
    said computer readable media containing executable program instruction for the practice of the method of claim 1 or claim 12 or claim 20 or claim 30.

40. Electromagnetic signals propagating on a computer network, comprising:
    said electromagnetic signals carrying instruction for the practice of the method of claim 1 or claim 12 or claim 20 or claim 30.

41. An apparatus having at least one processor and at least one memory coupled to said at least one processor, said apparatus comprising:
    a reception module configured to receive a multicast message at an input interface, where said multicast message has an associated destination vector;
    an association module configured to associate a basis vector with each multicast virtual output queue of a selected set of multicast virtual output queues, said set of multicast virtual output queues having more than one and less than $2^N$ individual multicast virtual out-put queues for said input interface, where N equals the number of individual output interfaces to which the said multicast message could be directed;
    a selection module configured to select a basis vector, as a selected basis vector, by comparing said destination vector of said multicast message with each said basis vector; and
    an assignment module to assign said multicast message to a multicast virtual output queue associated with said selected basis vector.

42. The apparatus of claim 41 wherein said comparing involves determining a distance measure between said destination vector and each said basis vector.

43. The apparatus of claim 42 wherein said distance measure is a square of a Euclidean distance.

44. An apparatus of claim 41 further comprising:
    a send module configured to send a head element of a multicast virtual output queue of said set of multicast virtual output queues to output interfaces.

45. An apparatus for routing a packet having an associated destination vector arriving at an input interface of a switching device, said input interface having at least one processor and at least one memory coupled to said at least one processor, said apparatus including:

a set of multicast virtual output queues for said input interface;

a determination module configured to determine whether said packet is part of an existing flow;

a first assignment module configured to assign said packet to one of said set of multicast virtual output queues associated with said existing flow responsive to a positive determination by said determination module;

a second assignment module configured to assign said packet to one of said set of multicast virtual output queues responsive to said destination vector responsive to a negative determination by said determination module; and a queuing module configured to queue said packet in said one multicast virtual output queue.

46. The apparatus of claim 45 wherein said first assignment module includes:

an update module configured to update a flow table entry associated with said destination vector responsive to a positive determination by said determination module;

a second update module configured to create a flow table entry associated with said destination vector and said one multicast virtual output queue responsive to a negative determination by said determination module.

47. The apparatus of claim 45 further including:

an update module configured to update said basis vector associated with said one multicast virtual output queue.

48. The apparatus of claim 45 wherein said update module is further configured to replace said basis vector with the centroid of said basis vector and said destination vector.

49. The apparatus of claim 45 wherein said update module further includes:

an adjustment module configured to adjust said basis vector by an amount calculated using a fixed centroid weight and said destination vector.

50. An apparatus having at least one processor and at least one memory coupled to said at least one processor for operating a switching device, said switching device having an input interface, said input interface having multicast capability, said apparatus comprising:

a set of multicast virtual output queues for said input interface;

a choose module configured to choose a set of basis vectors;

an association module configured to associate each basis vector of said set of basis vectors with a multicast virtual output queue of said set of multicast virtual output queues, responsive to said choose module;

a reception module configured to receive messages at said input interface; and a queue module configured to queue said messages in a multicast virtual output queue of said set of multicast virtual output queues.

51. The apparatus of claim 50 wherein said choose module is configured to choose such that the sum of a distance measure between said set of basis vectors and a set of destination vectors is minimized.

52. The apparatus of claim 50 wherein one of said basis vectors is a broadcast vector.

53. The apparatus of claim 50 wherein said choose module is configured to choose using vector quantization.

54. A computer program product comprising:

a computer usable storage medium having computer readable code embodied therein for causing a computer to route a packet arriving at a switching device, said packet being associated with a set of destinations, said computer readable code includes:

computer readable code configured to receive a multicast message at an input interface, where said multicast message has an associated destination vector;

computer readable code configured to associate a basis vector with each multicast virtual output queue of a set of multicast virtual output queues said set of multicast virtual output queues having more than one and less than $2^N$ individual multicast virtual output queues for said input interface, where N equals the number of individual output interfaces to which the said multicast message could be directed;

computer readable code configured to select a basis vector, as a selected basis vector, by comparing said destination vector of said multicast message with each said basis vector; and computer readable code configured to assign said multicast message to a multicast virtual output queue associated with said selected basis vector.

55. The computer program product of claim 54 wherein said comparing involves determining a distance measure between said destination vector and each said basis vector.

56. The computer program product of claim 55 wherein said distance measure is a square of a Euclidean distance.

57. A computer program of claim 54 further comprising:

computer readable code configured to send a head element of a multicast virtual output queue of said set of multicast virtual output queues to output interfaces.

58. A computer program product comprising:

a computer usable storage medium having computer readable code embodied therein for operating a switching device, said switching device having an input interface, said input interface having multicast capability, said input interface having a set of multicast virtual output queues, said computer readable code includes:

computer readable code configured to choose a set of basis vectors;

computer readable code configured to associate each basis vector of said set of basis vectors with a multicast virtual output queue of said set of multicast virtual output queues;

computer readable code configured to receive messages at said input interface; and computer readable code configured to queue said messages in a multicast virtual output queue of said set of multicast virtual output queues.

59. A computer program product comprising:

a computer data signal embodied in a carrier wave having computer readable code embodied therein for causing a computer to route a packet arriving at a switching device, said packet being associated with a set of destinations, said computer readable code includes:

computer readable code configured to receive a multicast message at an input interface, where said multicast message has an associated destination vector;

computer readable code configured to associate a basis vector with each multicast virtual output queue of a set of multicast virtual output queues said set of multicast virtual output queues having more than one and less than $2^N$ individual multicast virtual output queues for said input interface, where N equals the number of individual output interfaces to which the said multicast message could be directed;

computer readable code configured to select a basis vector, as a selected basis vector, by comparing said destination vector of said multicast message with each said basis vector; and computer readable code configured to assign said multicast message to a multicast virtual output queue associated with said selected basis vector.

60. A computer product of claim 59 further including:

computer readable code configured to send a head element of a multicast virtual output queue of said set of multicast virtual output queues to output interfaces.

61. A switching device, comprising:

means for receiving a multicast message at an input interface, where said multicast message has an associated destination vector;

means for associating a basis vector with each multicast virtual output queue of a set of multicast virtual output queues, said set of multicast virtual output queues having more than one and less than $2^N$ individual multicast virtual output queues for said input interface, where N equals the number of individual output interfaces to which the said multicast message could be directed;

means for selecting a basis vector, as a selected basis vector, by comparing said destination vector of said multicast message with each said basis vector; and assigning said multicast message to a multicast virtual output queue associated with said selected basis vector.

62. A switching device as in claim 61 further comprising:

means for sending a head element of a multicast virtual output queue of said set of multicast virtual output queues to output interfaces.

63. A switching device as in claim 61 further comprising:

means for determining a distance measure between said destination vector and each said basis vector in said comparing said destination vector with each said basis vector.

64. A switching device as in claim 63 further comprising:

means for computing said distance measure as a square of a Euclidean distance.

65. A switching device as in claim 63 further comprising:

means for calculating said distance measure for destination vector $\vec{D}$ and basis vector $\vec{B}$ where both are of N dimensions, as $$\sum_{i=1}^{N}(d_i-b_i)^2.$$

66. A switching device as in claim 63 further comprising:

means for calculating said distance measure using a content addressable memory.

67. A switching device as in claim 61 further comprising:

means for computing an updated basis vector in response to said destination vector of said multicast message.

68. A switching device as in claim 67 further comprising:

means for computing said updated basis vector by the expression $$\vec{UB}=\frac{[\vec{SB}+(\vec{D}*CW)]}{(1+CW)}$$

where $\vec{UB}$ is said updated basis vector, $\vec{SB}$ is said selected basis vector, $\vec{D}$ is said destination vector, and CW is a centroid weight.

69. A switching device as in claim 68 further comprising:

means for setting CW=0.1.

70. A switching device as in claim 68 further comprising:

means for setting CW equal the centroid of said selected basis vector and said destination vector.

71. A switching device as in claim 68 further comprising:

means for saving updated basis vectors in memory; and means for substituting said updated basis vectors for use as basis vectors in response to expiration of a window count.

72. A switching device, comprising:

means for receiving a packet at a multicast input interface of a switching device, said packet having an associated destination vector;

means for associating a basis vector with each multicast virtual output queue of a set of multicast virtual output queues to create a set of basis vectors;

means for selecting a multicast virtual output queue responsive to a comparison of said destination vector with said set of basis vectors, and means for queuing said packet in said multicast virtual output queue.

73. A switching device as in claim 72 further comprising:

means for sending a head element of a multicast virtual output queue of said set of multicast virtual output queues to output interfaces.

74. A switching device as in claim 72 further comprising:

means for determining a distance measure between said destination vector and each said basis vector in said comparing said destination vector with each said basis vector.

75. A switching device as in claim 74 further comprising:

means for computing said distance measure as a square of a Euclidean distance.

76. A switching device as in claim 74 further comprising:

means for calculating said distance measure for destination vector $\vec{D}$ and basis vector $\vec{B}$ where both are of N dimensions, as $$\sum_{i=1}^{N}(d_i-b_i)^2.$$

77. A switching device as in claim 74 further comprising:

means for calculating said distance measure using a content addressable memory.

78. A switching device as in claim 72 further comprising:

means for computing an updated basis vector in response to said destination vector of said multicast message.

79. A switching device as in claim 78 further comprising:

means for computing said updated basis vector by the expression $$\vec{UB}=\frac{[\vec{SB}+(\vec{D}*CW)]}{(1+CW)}$$

where $\vec{UB}$ is said updated basis vector, $\vec{SB}$ is said selected basis vector, $\vec{D}$ is said destination vector, and CW is a centroid weight.

80. A switching device as in claim 79 further comprising:
means for setting CW=0.1.

81. A switching device as in claim 79 further comprising:
means for setting CW equal the centroid of said selected basis vector and said destination vector.

82. A switching device as in claim 78 further comprising:
means for saving updated basis vectors in memory, and
means for substituting said updated basis vectors for use as basis vectors in response to expiration of a window count.

83. A method as in claim 20 further comprising:
sending a head element of a multicast virtual output queue of said set of multicast virtual output queues to output interfaces.

* * * * *